(12) United States Patent
Nishimura et al.

(10) Patent No.: US 11,461,918 B2
(45) Date of Patent: Oct. 4, 2022

(54) INFORMATION PROCESSOR AND DETECTION METHOD FOR DETECTING MISALIGNMENT OF A VEHICLE-MOUNTED IMAGING DEVICE

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 258 days.

(21) Appl. No.: 16/804,306

(22) Filed: Feb. 28, 2020

(65) Prior Publication Data
US 2020/0286250 A1   Sep. 10, 2020

(30) Foreign Application Priority Data
Mar. 4, 2019   (JP) .............................. JP2019-038481

(51) Int. Cl.
*H04N 5/228* (2006.01)
*G06T 7/70* (2017.01)
*G06T 7/00* (2017.01)
*B60R 11/04* (2006.01)

(52) U.S. Cl.
CPC .................. *G06T 7/70* (2017.01); *G06T 7/97* (2017.01); *B60R 11/04* (2013.01); *G06T 2207/30244* (2013.01)

(58) Field of Classification Search
CPC ... G06T 7/97; G06T 7/70; G06T 2207/30244; B60R 11/04

USPC ....................................................... 348/222.1
See application file for complete search history.

(56) References Cited

U.S. PATENT DOCUMENTS

| | | | | |
|---|---|---|---|---|
| 8,854,465 | B1* | 10/2014 | McIntyre | B60R 25/1004 348/148 |
| 10,339,413 | B2* | 7/2019 | Huang | G06V 10/42 |
| 2005/0183128 | A1* | 8/2005 | Assayag | H04N 17/06 725/105 |
| 2006/0092278 | A1* | 5/2006 | Kondo | B60R 25/102 348/148 |
| 2007/0230798 | A1* | 10/2007 | Naylor | G08B 13/1961 382/219 |
| 2007/0247526 | A1* | 10/2007 | Flook | G08B 13/1961 348/161 |
| 2008/0152232 | A1* | 6/2008 | Skans | G08B 29/046 382/209 |
| 2008/0165250 | A1* | 7/2008 | Ekdahl | G07C 5/0891 348/148 |
| 2009/0010630 | A1 | 1/2009 | Higashibara et al. | |

(Continued)

FOREIGN PATENT DOCUMENTS

| CN | 101340565 A | 1/2009 |
|---|---|---|
| CN | 103079902 A | 5/2013 |

(Continued)

*Primary Examiner* — Usman A Khan
(74) *Attorney, Agent, or Firm* — Oliff PLC

(57) ABSTRACT

The disclosure includes: a first acquisition section that acquires a first image captured by an imaging device mounted on a vehicle after driving of the vehicle is finished; a second acquisition section that acquires a second image captured by the imaging device when driving of the vehicle is started; and a detection section that detects misalignment between the first image and the second image.

5 Claims, 4 Drawing Sheets

(56) References Cited

U.S. PATENT DOCUMENTS

| | | | |
|---|---|---|---|
| 2013/0147945 A1 | 6/2013 | Watanabe et al. | |
| 2016/0044240 A1* | 2/2016 | Beers | H04N 5/23238 348/36 |
| 2017/0076154 A1* | 3/2017 | Schupp | G11B 27/031 |
| 2017/0154241 A1* | 6/2017 | Shambik | G06V 20/58 |
| 2017/0240110 A1* | 8/2017 | Lopez-Hinojosa | B60R 11/04 |
| 2018/0349715 A1* | 12/2018 | Gupta | B60R 1/00 |
| 2019/0054880 A1* | 2/2019 | Muddukrishna | B60R 21/0136 |
| 2019/0137622 A1* | 5/2019 | Lopez-Hinojosa | G01S 7/4802 |
| 2019/0248439 A1* | 8/2019 | Wang | B60L 50/20 |
| 2019/0258879 A1* | 8/2019 | Vachhani | G06V 40/10 |

FOREIGN PATENT DOCUMENTS

| | | |
|---|---|---|
| CN | 206231303 U | 6/2017 |
| JP | H06-295396 A | 10/1994 |
| JP | 2004-001658 A | 1/2004 |
| JP | 2004-200819 A | 7/2004 |
| JP | 2007-038773 A | 2/2007 |
| JP | 2007-089082 A | 4/2007 |
| JP | 2016-140010 A | 8/2016 |
| JP | 6037351 B2 | 12/2016 |

\* cited by examiner

INFORMATION PROCESSOR AND DETECTION METHOD FOR DETECTING MISALIGNMENT OF A VEHICLE-MOUNTED IMAGING DEVICE

INCORPORATION BY REFERENCE

The disclosure of Japanese Patent Application No. 2019-038481 filed on Mar. 4, 2019 including the specification, drawings and abstract is incorporated herein by reference in its entirety.

BACKGROUND

1. Technical Field

The disclosure relates to an information processor, a detection method, and a program.

2. Description of Related Art

In recent years, there has been an increasing tendency of vehicles installed with a dashboard camera. The installment of the dashboard camera allows continuous recording an image in an image capturing direction of an on-board camera and thus can provide valid proof at the time of an accident or the like, for example.

SUMMARY

However, there is a case where a cleaner touches the on-board camera when cleaning the inside of the vehicle, or the like, which changes the image capturing direction of the on-board camera, for example. Consequently, a driver starts driving without noticing misalignment of the on-board camera. In such a case, the dashboard camera does not record the image in the direction intended by an on-board camera installer.

The disclosure has been made in view of the above point and therefore has a purpose of enabling detection of misalignment of a direction of an imaging device mounted on a vehicle prior to a start of driving.

An information processor according to an aspect of the disclosure includes: a first acquisition section that acquires a first image captured by an imaging device mounted on a vehicle after driving of the vehicle is finished; a second acquisition section that acquires a second image captured by the imaging device when driving of the vehicle is started; and a detection section that detects misalignment between the first image and the second image.

Thus, the misalignment of the image, which is captured by the imaging device when driving of the vehicle is started, from the image, which is captured after driving of the vehicle is finished, is detected at the time of starting.

Therefore, it is possible to detect misalignment of a direction of the imaging device mounted on the vehicle prior to the start of driving.

In the information processor according to the aspect of the disclosure, the detection section may detect the misalignment of the image capturing direction by comparing a region of a part of the vehicle in the first image with that in the second image.

Thus, even in the case where background other than the region of the part is changed, the misalignment of the image capturing direction is not detected as long as the region of the part is not changed.

Therefore, it is possible to avoid erroneous detection of the misalignment of the image capturing direction caused by the change in the background.

In the information processor according to the aspect of the disclosure, time after driving of the vehicle is finished may be time when a power source of the vehicle is stopped, and time when driving of the vehicle is started may be time when the power source of the vehicle is started.

Thus, the misalignment of the image, which is captured by the imaging device when the power source of the vehicle is started, from the image, which is captured when the power source of the vehicle is stopped, is detected at the time of starting.

Therefore, it is possible to detect the misalignment of the direction of the imaging device mounted on the vehicle prior to the start of driving.

A detection method according to another aspect of the disclosure executed by an information processor includes: a first acquisition procedure for acquiring a first image captured by an imaging device mounted on a vehicle after driving of the vehicle is finished; a second acquisition procedure for acquiring a second image captured by the imaging device when driving of the vehicle is started; and a detection procedure for detecting misalignment of an image capturing direction of the imaging device on the basis of a comparison between the first image and the second image.

Thus, the misalignment of the image, which is captured by the imaging device when driving of the vehicle is started, from the image, which is captured after driving of the vehicle is finished, is detected at the time of starting.

Therefore, it is possible to detect the misalignment of the direction of the imaging device mounted on the vehicle prior to the start of driving.

A program according to yet another aspect of the disclosure makes an information processor execute: a first acquisition procedure for acquiring a first image captured by an imaging device mounted on a vehicle after driving of the vehicle is finished; a second acquisition procedure for acquiring a second image captured by the imaging device when driving of the vehicle is started; and a detection procedure for detecting misalignment of an image capturing direction of the imaging device on the basis of a comparison between the first image and the second image.

Thus, the misalignment of the image, which is captured by the imaging device when driving of the vehicle is started, from the image, which is captured after driving of the vehicle is finished, is detected at the time of starting.

Therefore, it is possible to detect the misalignment of the direction of the imaging device mounted on the vehicle prior to the start of driving.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
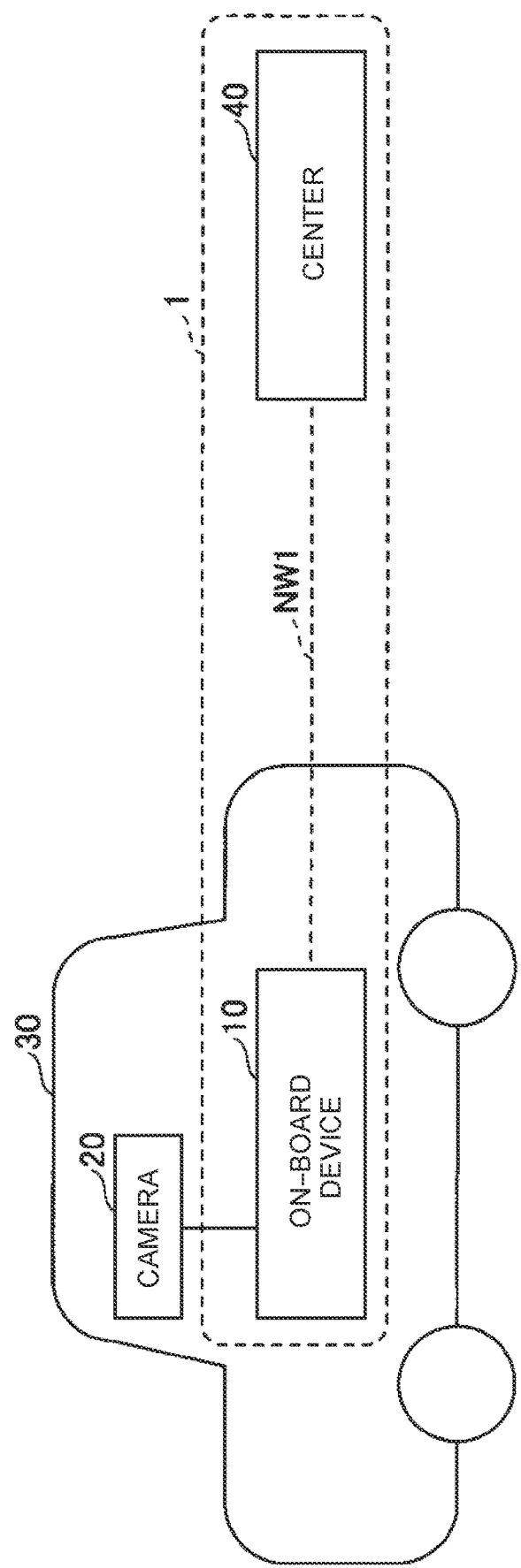
FIG. 1 is a view illustrating a configuration example of an information processing system 1 according to an embodiment of the disclosure.

A description will hereinafter be made on an embodiment of the disclosure with reference to the drawings. FIG. 1 is a view illustrating a configuration example of an information processing system 1 according to the embodiment of the disclosure. In FIG. 1, the information processing system 1 includes an on-board device 10, a center 40, and the like. The on-board device 10 and the center 40 can communicate with each other via a predetermined communication network NW1 such as a mobile communication network, which is a wireless communication network having a large number of base stations as terminals, or the Internet network. Although only one vehicle 30 is illustrated in FIG. 1 for convenience of the description, the on-board devices 10 in the plural vehicles 30 may be communicable with the center 40 via the network NW1.

The on-board device 10 is an information processor (a computer) that is mounted on the vehicle 30 and has an information processing function and a communicating function. For example, the on-board device 10 may include a navigation system. In this embodiment, the on-board device 10 is connected to a camera 20 that is installed in the vehicle 30 in such a manner as to be able to capture an image in front of the vehicle 30, and the on-board device 10 receives the image captured by the camera 20. The camera 20 may be a dashboard camera or a camera that is installed for a purpose of assisting with driving, for example.

The vehicle 30 is an automobile that has an engine, a motor, or the like as a power source, for example.

The center 40 is a collection of the one or more computers (the information processors).

Figure 2:
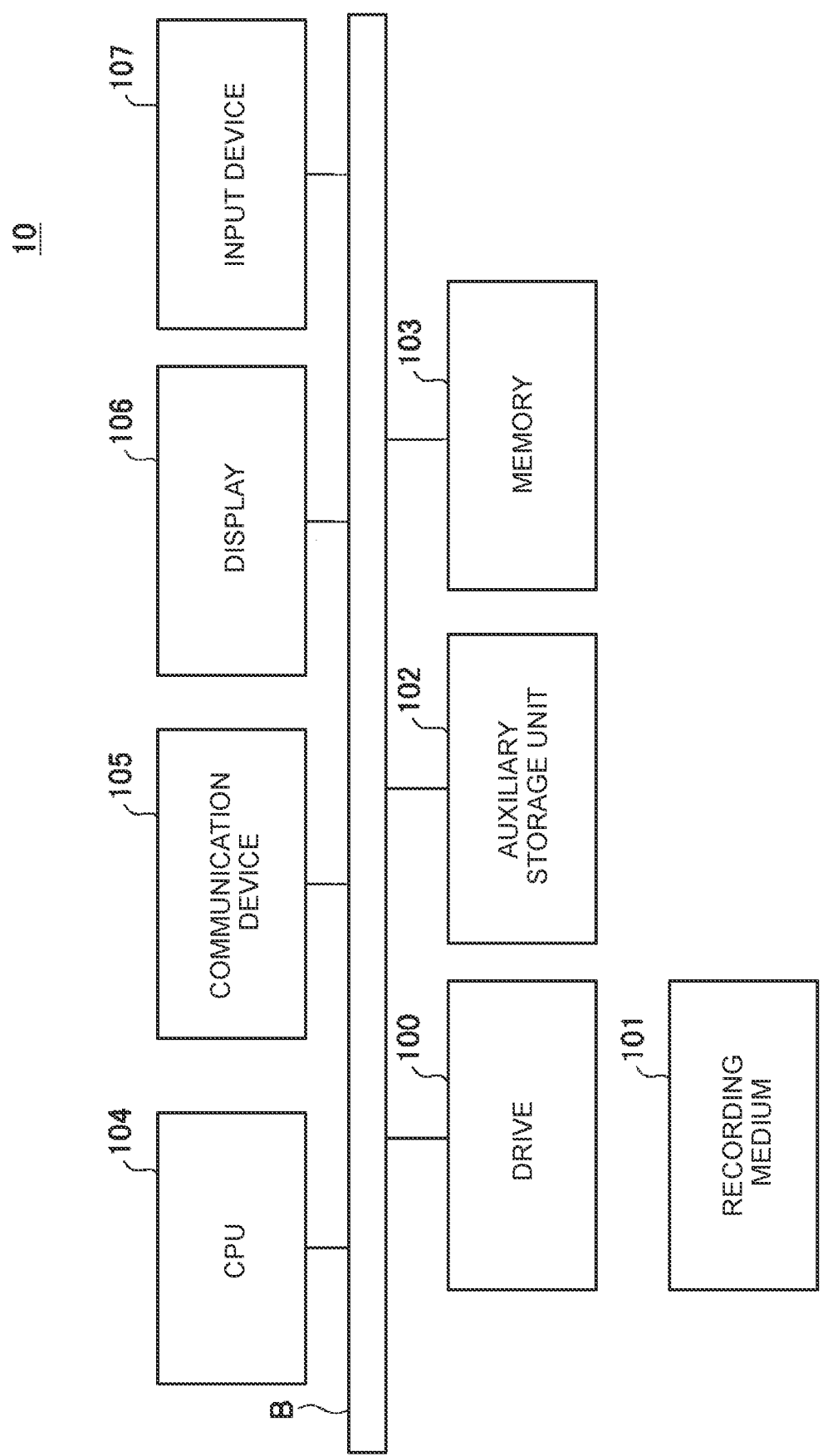
FIG. 2 is a diagram illustrating a hardware configuration example of an on-board device 10 in the embodiment of the disclosure.

FIG. 2 is a diagram illustrating a hardware configuration example of the on-board device 10 in the embodiment of the disclosure. The on-board device 10 in FIG. 2 includes a drive 100, an auxiliary storage unit 102, a memory 103, a CPU 104, a communication device 105, a display 106, an input device 107, and the like.

A program that implements processing in the on-board device 10 is provided by a recording medium 101 such as an SD memory card. When the recording medium 101, which stores the program, is set in the drive 100, the program is installed into the auxiliary storage unit 102 from the recording medium 101 via the drive 100. However, the program does not always have to be installed from the recording medium 101 and may be downloaded from another computer via the network. The auxiliary storage unit 102 stores the installed program and also stores necessary files, data, and the like.

When a program running command is issued, the memory 103 reads and stores the program from the auxiliary storage unit 102. The CPU 104 implements functions related to the on-board device 10 according to the program stored in the memory 103. The communication device 105 is a device connected to the network by wireless communication. The communication device 105 may be realized by a Data Communication Module (DCM), for example. The display 106 is a liquid crystal display or the like, for example, and shows a graphical user interface (GUI) by the program, and the like. The input device 107 is used by a user to input various operation commands. For example, the input device 107 may be a touchscreen.

Figure 3:
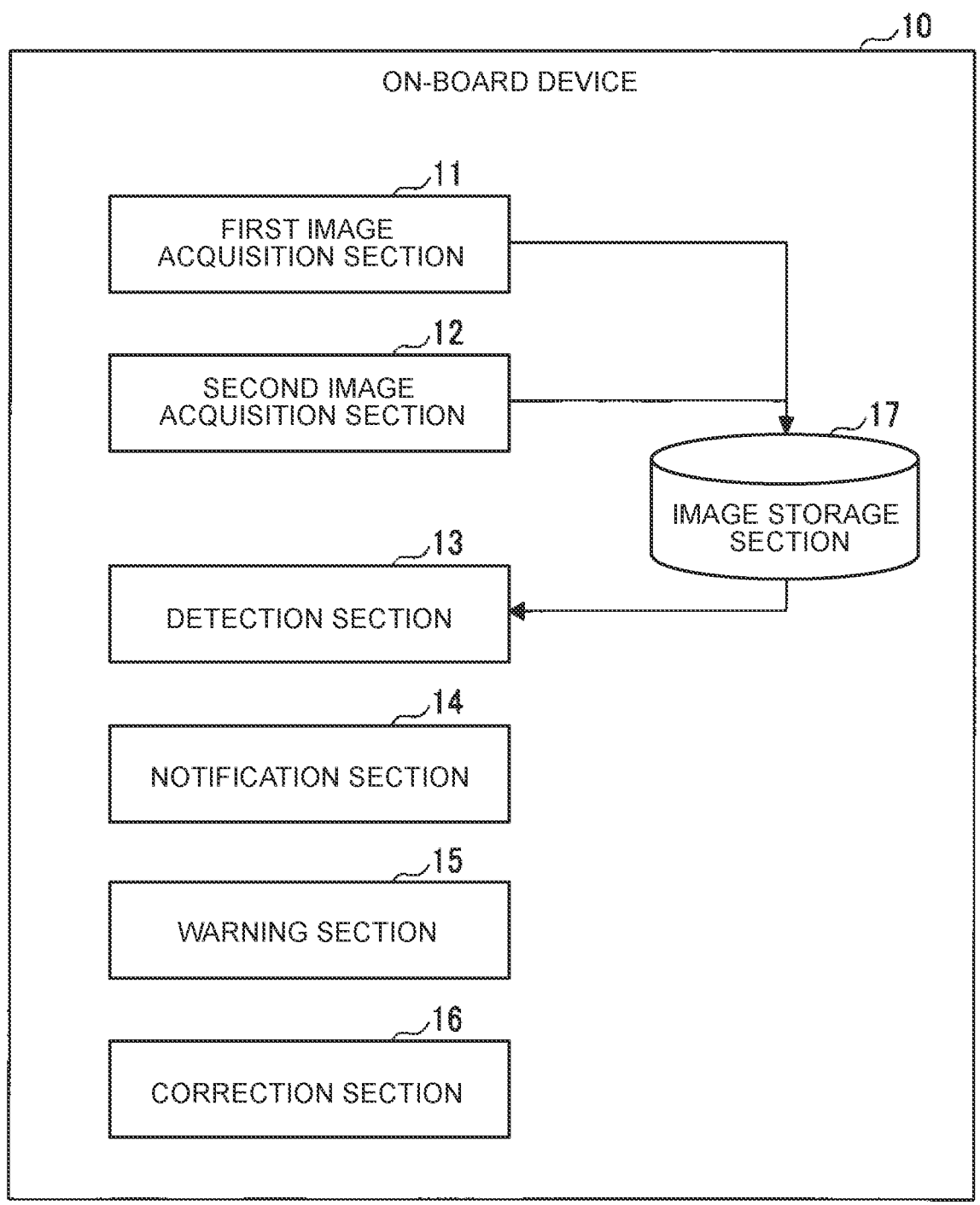
FIG. 3 is a diagram illustrating a functional configuration example of the on-board device 10 in the embodiment of the disclosure.

FIG. 3 is a diagram illustrating a functional configuration example of the on-board device 10 in the embodiment of the disclosure. In FIG. 3, the on-board device 10 includes a first image acquisition section 11, a second image acquisition section 12, a detection section 13, a notification section 14, a warning section 15, a correction section 16, and the like. Each of these sections is realized by processing that is executed when the CPU 104 runs the one or more programs installed in the on-board device 10. The on-board device 10 also uses an image storage section 17. The image storage section 17 can be realized by using the auxiliary storage unit 102 and the like, for example.

After driving of the vehicle 30 is finished (for example, when the power source is stopped such as when an ignition is turned off and the vehicle 30 is parked), the first image acquisition section 11 acquires the image captured by the camera 20 (hereinafter referred to as an "image A") from the camera 20. The first image acquisition section 11 stores the image A in the image storage section 17.

When driving of the vehicle 30 is started (for example, when the power source is started such as when the ignition is turned on and the vehicle 30 starts traveling from a parked position), the second image acquisition section 12 acquires the image captured by the camera 20 (hereinafter referred to as an "image B") from the camera 20. The second image acquisition section 12 stores the image B in the image storage section 17.

By comparing the image A and the image B stored in the image storage section 17, the detection section 13 detects misalignment of an image capturing direction (for example, an optical axis) of the camera 20, and also calculates an amount and a direction of the misalignment. The original image capturing direction of the camera 20 may be measured in advance when the camera 20 is attached, for example.

In the case where the detection section 13 detects the misalignment, the notification section 14 sends information on occurrence of the misalignment to the center 40.

In the case where the detection section 13 detects the misalignment, the warning section 15 outputs warning information on the occurrence of the misalignment to the inside of the vehicle 30. The warning information may be output by voice or may appear on the display 106, for example.

In the case where the misalignment amount calculated by the detection section 13 is smaller than a threshold, the correction section 16 corrects (adjusts) values of various parameters (hereinafter referred to as "image processing parameters") used for image processing of the image captured by the camera 20.

Figure 4:
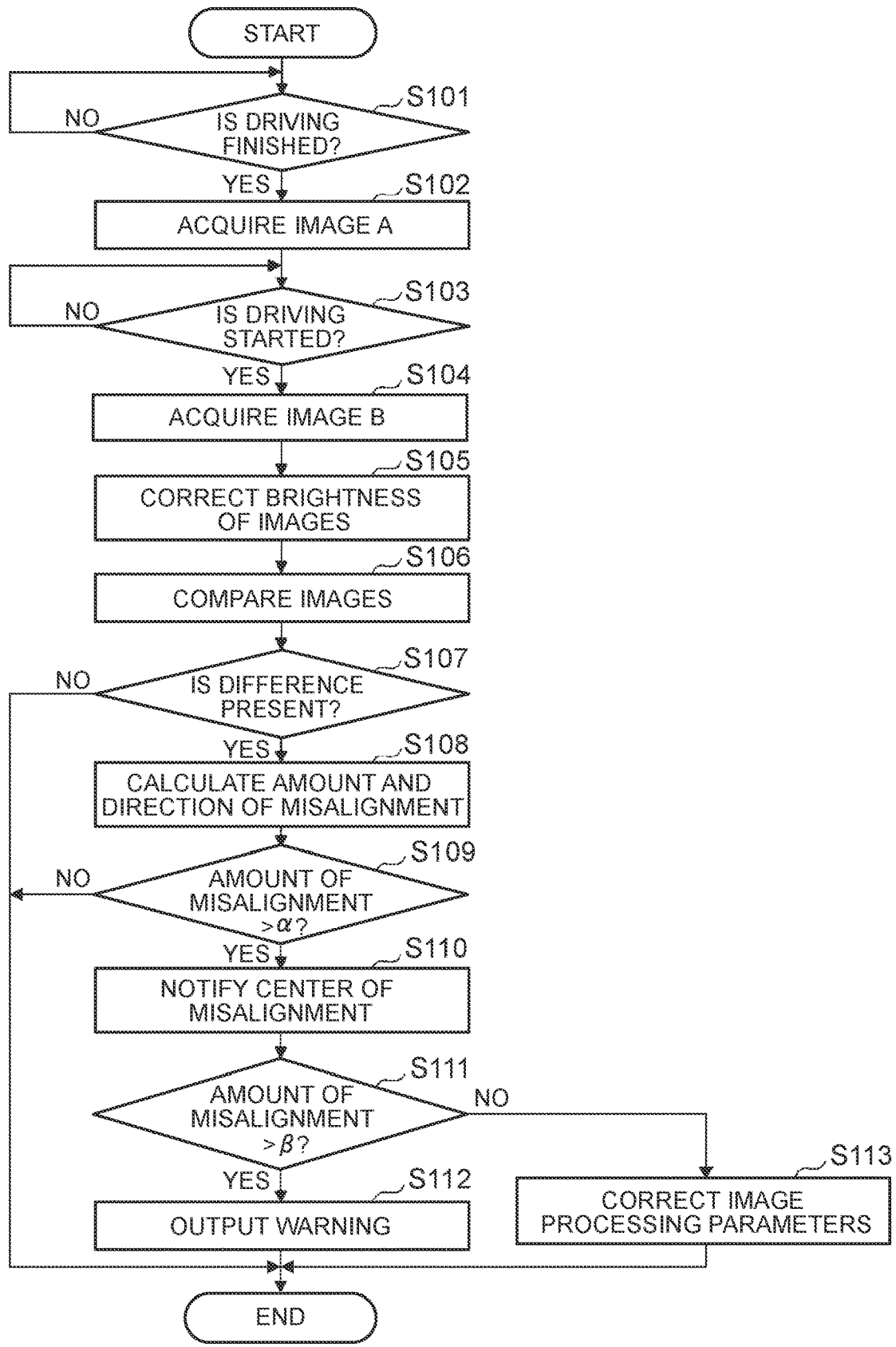
FIG. 4 is a flowchart illustrating an example of a processing procedure executed by the on-board device 10.

A description will hereinafter be made on a processing procedure executed by the on-board device 10. FIG. 4 is a flowchart illustrating an example of the processing procedure executed by the on-board device 10. At initiation of the flowchart in FIG. 4, it is assumed that a state of the vehicle 30 is a driving state.

In order to park the vehicle 30, when a driver performs an operation to finish driving the vehicle 30 (stop the power source) such as turning off the ignition (YES in S101), the first image acquisition section 11 automatically acquires the image A, which is captured by the camera 20 at a current time point, from the camera 20 and stores the image A in the image storage section 17 (S102). Step S102 may not be executed when driving is finished (immediately after driving is finished). For example, step S102 may be executed in a predetermined period after driving is finished.

Thereafter, in order to start driving the vehicle 30 (again), when the driver performs an operation (an operation to start the power source) such as turning on the ignition (YES in S103), the second image acquisition section 12 automatically acquires the image B, which is captured by the camera 20 at a current time point, from the camera 20 and stores the image B in the image storage section 17 (S104).

According to the image B stored in the image storage section 17, the detection section 13 corrects brightness (luminance) of the image A and the image B (S105). The correction is made to improve accuracy of a determination on presence or absence of a difference in the two compared images. For example, the correction may be processing to match average values of the luminance of the image A and the image B with each other.

Next, the detection section 13 compares the image A and the image B (S106), and determines the presence or the absence of the difference therebetween (S107). The comparison of the two images and the determination on the presence or the absence of the difference therebetween may be made by using a known technique. For example, a background differencing technique or the like may be used. In addition, the determination on the presence or the absence of the difference between the image A and the image B may be made not by determining the presence or the absence of the difference in a pixel value level but by determining the presence or the absence of the difference in contents of the images. For example, even in the case where the vehicle 30 remains unmoved from the time of being parked to the time of being driven again and the image capturing direction of the camera 20 is not changed, there is a possibility that the pixel value of each of the captured images is changed by weather and time of day. The determination on the presence or the absence of the difference may be made in consideration of the above circumstances.

A case where scenery in the image capturing direction of the camera 20 is changed from the time of parking to the time of driving again is also considered. For example, in the case where an object that exists in front of the vehicle 30 at the time of parking disappears at the time of driving again, the opposite case thereto, the case where the vehicle 30 is towed away by a tow truck, or the like, the scenery in the image capturing direction of the camera 20 is changed. In this case, even when the image capturing direction of the camera 20 is not misaligned, there is a possibility that the difference is detected between the image A and the image B. In order to avoid such erroneous detection, a region (a pixel group) of the image A where a part of the vehicle 30 (for example, a front end part of the vehicle 30) is captured may be compared with a corresponding region of the image B. This is because, in the case where the image capturing direction of the camera 20 is aligned, the part of the vehicle 30 is captured in the region of each of the image A and the image B, and in the case where the image capturing direction of the camera 20 is misaligned, the content of the region of the image B differs from the content of the region of the image A.

If there is no difference between the image A and the image B (NO in S107), the processing procedure in FIG. 4 is terminated. If there is the difference between the image A and the image B (YES in S107), the detection section 13 calculates the amount and the direction of the misalignment of the image content between the image A and the image B (S108). For example, the amount and the direction of the misalignment of the image content may be calculated on the basis of misalignment of a position of the same object (a captured object) between the images, or may be calculated on the basis of another known image processing technique. In addition, for example, the amount of the misalignment may be expressed in units of the pixel or may be expressed by an angle in the image capturing direction of the camera 20. In this embodiment, the amount of the misalignment is equal to or larger than 0.

Next, the detection section 13 determines whether the amount of the misalignment exceeds a threshold $\alpha$ (S109). The threshold $\alpha$ is a value that represents an upper limit of the ignorable amount of the misalignment. For example, the ignorable amount means such a degree of an error that is generated by various types of the image processing (for example, image recognition, measurement of the distance to the preceding vehicle, and the like) on the image captured by the camera 20 and having such an amount of the misalignment and that can be ignored. When even the minimum error is not allowed, the threshold $\alpha$ is set to 0.

If the amount of the misalignment is equal to or smaller than the threshold $\alpha$ (NO in S109), the processing procedure in FIG. 4 is terminated. If the amount of the misalignment exceeds the threshold $\alpha$ (YES in S109), the notification section 14 sends notification information, which includes misalignment information on the amount of the misalignment and the direction of the misalignment and identification information of the vehicle 30 (hereinafter referred to as "vehicle ID"), to the center 40 (S110). In this case, the notification information indicating that the image capturing direction of the camera 20 is misaligned may be sent to a communication terminal (for example, a smartphone, a cellular phone, or the like) possessed by a person who is managed by the center 40 in association with the vehicle ID (the driver, an administrator, or the like of the vehicle 30 with the vehicle ID) or to the on-board device 10 of the vehicle 30. Referring to the notification information, the person can recognize the misalignment of the image capturing direction of the camera 20 before the vehicle 30 starts being driven, and thus can perform a task to correct the misalignment.

Next, the warning section 15 determines whether the amount of the misalignment exceeds a threshold $\beta$ (S111). The threshold $\beta$ is an upper limit of such an amount of the misalignment that inconvenience caused by the misalignment can be eliminated by correcting the image processing parameters in the image processing on the image captured by the camera 20.

If the amount of the misalignment exceeds the threshold $\beta$ (YES in S111), the warning section 15 outputs the warning information (S112). In this case, the driver can recognize the misalignment of the image capturing direction of the camera 20 before starting driving, and thus can perform the task to correct the misalignment.

If the amount of the misalignment is equal to or smaller than the threshold $\beta$ (NO in S111), the correction section 16 corrects the image processing parameters (S113). For example, in the case where image recognition is performed on the image captured by the camera 20, a region of the image recognition (a region of interest (ROI)) may be corrected on the basis of the amount of the misalignment and the direction of the misalignment. In addition, in the case where a distance to a proceeding vehicle or the like is calculated on the basis of the image, a parameter value indicating the angle of the camera 20 for calculation of the distance may be corrected to a current angle.

As described above, according to this embodiment, the misalignment of the image, which is captured at the time when driving of the vehicle 30 is started, from the image, which is captured after driving of the vehicle 30 is finished, is detected. Thus, it is possible to detect the misalignment of the direction of the imaging device mounted on the vehicle 30 prior to the start of driving.

The processing procedure in FIG. 4 may be executed by the center 40. In other words, the center 40 may have the functional configuration in FIG. 3. In this case, at timing of step S102 and step S104, the on-board device 10 may send the image A and the image B to the center 40, respectively.

In this embodiment, the first image acquisition section 11 is an example of the first acquisition section. The second image acquisition section 12 is an example of the second acquisition section. The image A is an example of the first image. The image B is an example of the second image.

The detailed description has been made so far on the embodiment of the disclosure. The disclosure is not limited to such a particular embodiment, and various modifications and changes can be made thereto within the scope of the gist of the disclosure described in the claims.

What is claimed is:

1. An information processor comprising:
   a processor programmed to:
      acquire a first image captured by an imaging device mounted on a vehicle in response to turning off an ignition of the vehicle, which indicates that driving of the vehicle is finished;
      acquire a second image captured by the imaging device in response to turning on the ignition of the vehicle, which indicates that driving of the vehicle is started; and
      detect misalignment between the captured first image and the captured second image.

2. The information processor according to claim 1, wherein the processor detects the misalignment of a region of a part of the vehicle between the first image and the second image.

3. The information processor according to claim 1, wherein a power source of the vehicle is stopped at a time after driving of the vehicle is finished, and the power source of the vehicle is started at a time when driving of the vehicle is started.

4. A detection method executed by an information processor, the method comprising:
   acquiring a first image captured by an imaging device mounted on a vehicle in response to turning off an ignition of the vehicle, which indicates that driving of the vehicle is finished;
   acquiring a second image captured by the imaging device in response to turning on the ignition of the vehicle, which indicates that driving of the vehicle is started; and
   detecting misalignment between the captured first image and the captured second image.

5. A non-transitory computer readable storage medium storing a computer program that, when executed by an information processor, causes the information processor to perform steps comprising:
   acquiring a first image captured by an imaging device mounted on a vehicle in response to turning off an ignition of the vehicle, which indicates that driving of the vehicle is finished;
   acquiring a second image captured by the imaging device in response to turning on the ignition of the vehicle, which indicates that driving of the vehicle is started; and
   detecting misalignment between the captured first image and the captured second image.

* * * * *